United States Patent [19]
Chang et al.

[11] 3,880,767
[45] Apr. 29, 1975

[54] NEMATIC LIQUID-CRYSTAL COMPOSITIONS

[75] Inventors: Roger Chang, Thousand Oaks; John P. Dobbins, San Marino, both of Calif.

[73] Assignee: Rockwell International, El Sequndo, Calif.

[22] Filed: Oct. 12, 1972

[21] Appl. No.: 297,172

Related U.S. Application Data

[63] Continuation of Ser. No. 87,515, Nov. 6, 1970, abandoned.

[52] U.S. Cl. ...... 252/299; 252/408 LC; 350/160 LC
[51] Int. Cl. ......... G09f 1/28; G09f 1/36; G03b 1/24
[58] Field of Search . 96/1.5; 252/501, 304, 408 LC, 252/299; 350/160 LC, 150; 161/410

[56] References Cited
UNITED STATES PATENTS
3,499,702   3/1970   Goldmacher et al. ......... 350/160 LC
3,690,745   9/1972   Jones ................................. 252/408

FOREIGN PATENTS OR APPLICATIONS
1,170,486   11/1969   United Kingdom ................. 252/408

OTHER PUBLICATIONS
Usol'tseva et al., Russian Chemical Reviews, Sept., 1963, Vol. 32, No. 9, pp. 495-507.
Kelker et al., Angew. Chem. International Edit., Vol. 8, No. 11, 1969, pages 884-885.

*Primary Examiner*—Norman G. Torchin
*Assistant Examiner*—J. P. Brammer
*Attorney, Agent, or Firm*—H. Fredrick Hamann; G. Donald Weber, Jr.; Robert Ochis

[57] ABSTRACT

Eutectic mixtures of nematic substances suitable for use as liquid crystals in electro-optic light valves which have a wide nematic range and which are preferably operative at or below normal room temperature are disclosed. A eutectic mixture containing p-methoxy-benzylidene-p'-n-butylaniline and p-ethoxy-benzylidene-p'-n-butylaniline is a preferred example.

4 Claims, 1 Drawing Figure

MIXTURE OF LIQUID CRYSTAL

"A" —methoxy-benzylidene-butyl-aniline
"B" —ethoxy-benzylidene-butyl-aniline

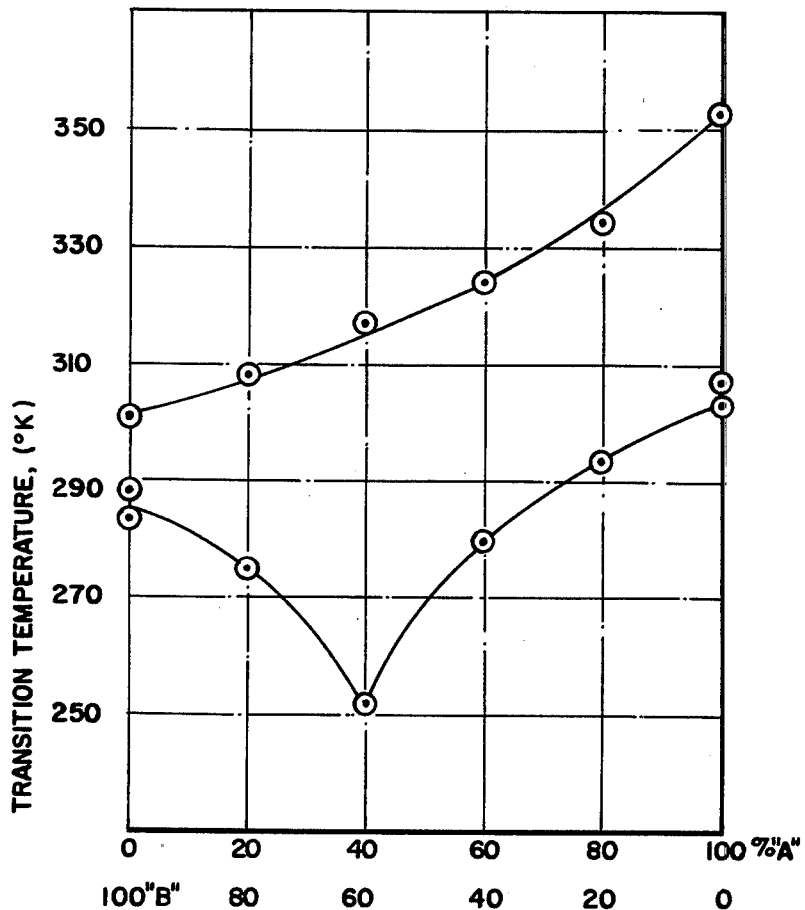

NEMATIC LIQUID-CRYSTAL COMPOSITIONS

This is a continuation of application Ser. No. 87,515 filed Nov. 6, 1970, and now abandoned.

BACKGROUND OF THE INVENTION

1. Field of the Invention

This invention relates to nematic liquid crystals and more particularly to eutectic mixtures of nematic substances.

2. Description of Prior Art

Nematic substances and nematic liquid-crystal light valves and display devices are described in British Pat. No. 441,274 and in U.S. Pat. No. 3,322,485. The use of pure nematic substances in these light valves has not been entirely satisfactory due to the relatively narrow temperature range in which they behave as liquid crystals and due to the fact that in most cases these nematic ranges are considerably above room temperature.

The nematic range of a liquid crystal is defined as the temperature range between the crystal/nematic-transistion temperature and the nematic/isotropic-transition temperature. For example, the nematic liquid crystal p-azoxyanisole has an operating range of 19°C between its crystal/nematic-transition temperature of 116°C and its nematic/isotropic-transition temperature of 135°C. Light valves which use a nematic substance which has a high nematic range require a heating element in order to heat the nematic substance to its required mesophasic condition or range. The use of a heating element in a light valve not only increases the cost and complexity of the apparatus but also results in a higher power consumption and a slower start-up time for all operations involving the light valve apparatus than is the case without the use of a heating element.

Forming a nematic liquid crystal mixture containing 10–90 weight percent of p-n-ethoxybenzylidene-p'-amino-benzonitrile and 90–10 weight percent p-n-butoxybenzylidene-p'-amino-benzonitrile to obtain a lower crystal/nematic-transition temperature is described in the U.S. Pat. No. 3,499,702. Crystal/nematic-transition temperatures as low as 41° and 50°C were obtained.

SUMMARY OF THE INVENTION

It is a primary object of this invention to provide an improved nematic liquid crystal composition.

It is another object of this invention to provide a nematic liquid crystal composition having a wide nematic range.

It is yet another object of this invention to provide a nematic liquid crystal composition suitable for nematic use at temperatures below and above room temperature.

The invention is accomplished by the use of a eutectic mixture of two nematic substances. A preferred embodiment is a eutectic mixture of p-methoxy-benzylidene-p'-n-butylaniline (MBBA) and p-ethoxy-benzylidene-p'-n-butylaniline (EBBA).

BRIEF DESCRIPTION OF THE DRAWING

The drawing shows a phase diagram for the eutectic mixture of p-methoxy-benzylidene-p'-n-butylaniline and p-ethoxy-benzylidene-p'-n-butylaniline.

DETAILED DESCRIPTION OF THE INVENTION

In general, a light valve containing a thin layer of nematic liquid crystal exhibiting negative dielectric anisotropy is relatively transparent to light in the absence of an electric field. When an electric field above a threshold value is applied to the liquid-crystal material, the light valve device when veiwed by transmitted light appears to darken in the region of the field. The operative region where this action occurs is shown in the phase diagram between the crystal/nematic-transition-temperature curve 12 and the nematic/isotropic-transition-temperature curve 14. The wider the difference between the two aforementioned temperature curves, the broader the mesophasic or operating range for the liquid-crystal mixture. The eutectic mixture 16 contains 60 weight-percent p-methoxy-benzylidene-p'-n-butylaniline and 40 weight-percent p-ethoxy-benzylidene-p'-n-butylaniline (hereinafter referred to as MBBA and EBBA, respectively.) The nematic operating range for this eutectic mixture is about 65°C. This broad range is from −21°C to a +42°C, a desirable temperature range which covers temperatures both above and below room temperature (20–25°C).

A preferred composition is generally the eutectic mixture of the two nematic liquid crystals. As shown by the phase diagram, a wide operating range is obtained when the composition varies ±2 weight percent from the eutectic mixture. In the case of the 60 weight-percent MBBA and 40 weight-percent EBBA, a satisfactorily wide operating range is still obtained within ±5 weight-percent of the eutectic mixture. Thus, a useful eutectic mixture is obtained with 55% MBBA and 45% EBBA, for example.

The lowest crystal/nematic-transition temperature is obtained with a eutectic mixture. In many mixtures, the widest operating range, that is the range between the crystal/nematic-transition temperature and the nematic/isotropic-transition temperature, is obtained with an eutectic mixture. There are some mixtures in which the shape of the nematic/isotropic-transition-temperature curve differs from that shown in the drawing and, as a result, the widest operating range will vary somewhat from the eutectic mixture composition described herein.

This invention is applicable to mixtures, especially eutectic mixtures, of all nematic liquid-crystal compounds. The broad class of organic compounds commonly known as Schiff bases is of special interest. Eutectic mixtures of specific Schiff base nematic liquid-crystal compounds having the following structure are preferred embodiments of this invention:

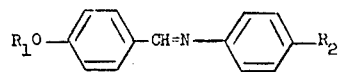

where $R_1 = CH_3$ and $C_2H_5$
$R_2 = C_nH_{2n+1}$; $n$ is from 2 to 12
and $R_1 + R_2$ have a total of at least four carbon atoms.

Examples of these compounds are:
p-methoxy-benzylidene-p'-n-butylaniline,
p-methoxy-benzylidene-p'-n-propylaniline,
p-methoxy-benzylidene-p'-n-hexylaniline,
p-ethoxy-benzylidene-p'-n-butylaniline,
p-ethoxy-benzylidene-p-ethylaniline,
p-ethoxy-benzylidene-p'-n-propylaniline and
p-ethoxy-benzylidene-p'-n-hexylaniline.

In this particular group of Schiff base compounds, an increase of the size of $R_1$ will raise the crystal/nematictransition-temperature curve. As a result, $R_1$ is limited to methyl and ethyl to provide a mixture which is liquid at room temperature. With respect to the size of the $R_2$ radical, it was found that increasing the size of the radical will decrease the transition temperature. It has been determined that, in order to produce suitable nematic liquid-crystal mixtures which are liquid at room temperature, the carbon atoms in $R_1$ and $R_2$ in the compound should total four or more. Compounds not having a total of at least four carbon atoms are not nematic liquid-crystal compounds.

Eutectic mixtures which are not liquid at room temperatures are presented as other examples of this invention and are set forth in the following table:

| Mixture | t.% | Eutectic Temperature |
|---|---|---|
| p-ethoxy, p'-butoxycarbonylazobenzene | 40 | 34° |
| p-methoxybenzylidene, p'-propoxy-carbonyl-isomethylpropylenylaniline | 60 | |
| p-ethoxy, p'-butoxycarbonylazobenzene | 54 | 42° |
| p-methoxy, p'-n-pentylcarbonyl-oxyazobenzene | 46 | |
| p-methoxybenzylidene, p'-propoxy-carbonyl-isomethylpropylenylaniline | 63 | 38° |
| p-methoxy, p'-n-pentylcarbonyl-oxyazobenzene | 37 | |

We claim:

1. A composition having a relatively wide nematic range suitable for use in a nematic liquid-crystal light valve comprising a eutectic mixture of two or more nematic substances each having the structure:

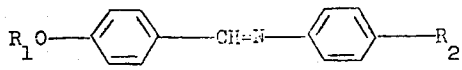

where $R_1 = C_nH_{2n+1}$; $n$ is 1 or 2,
$R_2 = C_nH_{2n+1}$; $n$ is from 2 to 12,
and $R_1 + R_2$ has a total of at least four carbon atoms;
said first nematic substance is p-ethoxy-benzylidene-p'n-butylaniline;
the concentration of said first nematic substance is about 35 to 45 weight percent of said composition; and
said second nematic substance is p-methoxy-benzylidene-p'-n-butylanilene;
the concentration of said second nematic substance is about 55 to 65 weight percent of said composition.

2. A nematic liquid crystal composition suitable for use in a light valve, said composition consisting of a nematic liquid crystal eutectic mixture having a nematic range which extends from below 0°C to above room temperature, said mixture consisting of about 35 to 45 weight percent p-ethoxy-benzylidene-p'n-butylaniline and about 65 to 55 weight percent p-methoxy-benzylidene-p'n-butylaniline.

3. A composition suitable for use in a light valve having an operating range extending from below 0°C to above room temperature, said composition consisting of a eutectic mixture of about 35 to 45 weight percent p-ethoxy-benzylidene-p'n-butylaniline and about 65 to 55 weight percent p-methoxy-benzylidene-p'n-butylaniline.

4. A composition suitable for use in a light valve having an operating range extending from below 0°C to above room temperature, said composition including a nematic liquid crystal consisting of a eutectic mixture of about 39 to 41 weight percent p-ethoxy-benzylidene-p'n-butylaniline and about 59 to 61 weight percent p-methoxy-benzylidene-p'n-butylaniline.

* * * * *